(12) United States Patent
Wang

(10) Patent No.: US 9,465,410 B2
(45) Date of Patent: Oct. 11, 2016

(54) ELECTRONIC DEVICE HOUSING AND METHOD FOR MANUFACTURING THE SAME

(71) Applicant: ShenZhen Treasure City Technology Co., LTD., Shenzhen (CN)

(72) Inventor: Hui Wang, Shenzhen (CN)

(73) Assignee: ShenZhen Treasure City Technology Co., LTD., ShenZhen (CN)

( * ) Notice: Subject to any disclaimer, the term of this patent is extended or adjusted under 35 U.S.C. 154(b) by 280 days.

(21) Appl. No.: 14/287,057

(22) Filed: May 26, 2014

(65) Prior Publication Data

US 2014/0354122 A1  Dec. 4, 2014

(30) Foreign Application Priority Data

May 28, 2013 (CN) .......................... 2013 1 02015948

(51) Int. Cl.
| | |
|---|---|
| H04M 1/00 | (2006.01) |
| G06F 1/16 | (2006.01) |
| H04M 1/02 | (2006.01) |
| G06F 1/18 | (2006.01) |
| H04B 1/3888 | (2015.01) |
| H04M 1/04 | (2006.01) |

(52) U.S. Cl.
CPC .............. *G06F 1/1658* (2013.01); *G06F 1/181* (2013.01); *H04M 1/0249* (2013.01); *G06F 1/1626* (2013.01); *G06F 1/1656* (2013.01); *H04B 1/3888* (2013.01); *H04M 1/026* (2013.01); *H04M 1/04* (2013.01); *Y10T 29/49947* (2015.01)

(58) Field of Classification Search
CPC ........... Y10T 29/49947; G06F 1/1658; G06F 1/1626; G06F 1/1656; G06F 2200/1633; G06F 1/1628; H04M 1/04; H04M 1/185; H04M 1/0249; H04M 1/0254; H04M 1/0283; H04M 1/026; H04B 1/3888
USPC ............. 455/575.1, 575.8, 90.3; 361/679.01, 361/679.3
See application file for complete search history.

(56) References Cited

U.S. PATENT DOCUMENTS

| | | | |
|---|---|---|---|
| 8,811,604 B2* | 8/2014 | Chen .................... | H04M 1/0235 379/433.12 |
| 2012/0069497 A1* | 3/2012 | Tang .................... | H05K 5/0017 361/679.01 |

* cited by examiner

*Primary Examiner* — Olumide T Ajibade Akonai
(74) *Attorney, Agent, or Firm* — Zhigang Ma

(57) ABSTRACT

An electronic device housing includes a first housing, a second housing, a limiting member, and a fastening member. The first housing includes a bottom wall, a top wall, and a sidewall coupling the bottom wall and the top wall. The bottom wall, the sidewall, and the top wall cooperatively define a receiving chamber. The top wall of the first housing defines a limiting hole. The second housing is adhered to the first housing and received in the receiving chamber. The second housing includes a top surface and a bottom surface. The top surface and the bottom surface are adhered to the corresponding top wall and bottom wall. The limiting member is inserted in the limiting hole and resists against the top surface of the second housing. The fastening member couples the top wall of the first housing and the top surface of the second housing.

15 Claims, 4 Drawing Sheets

ELECTRONIC DEVICE HOUSING AND METHOD FOR MANUFACTURING THE SAME

FIELD

The present disclosure relates to a housing, and particularly to a housing of an electronic device and method for manufacturing the housing.

BACKGROUND

An electronic device, such as a mobile phone or a tablet computer, can include more than one housing. For example, an electronic device can include an outer housing and a support housing received in the outer housing. The support housing can be configured to support elements of the electronic device. The two housings of the electronic devices need to be assembled together.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean "at least one."

The term "coupled" is defined as being connected whether directly, or indirectly through intervening components, and is not necessarily limited to physical connections. The connection can be such that objects are permanently connected or releasably connected.

Figure 1:
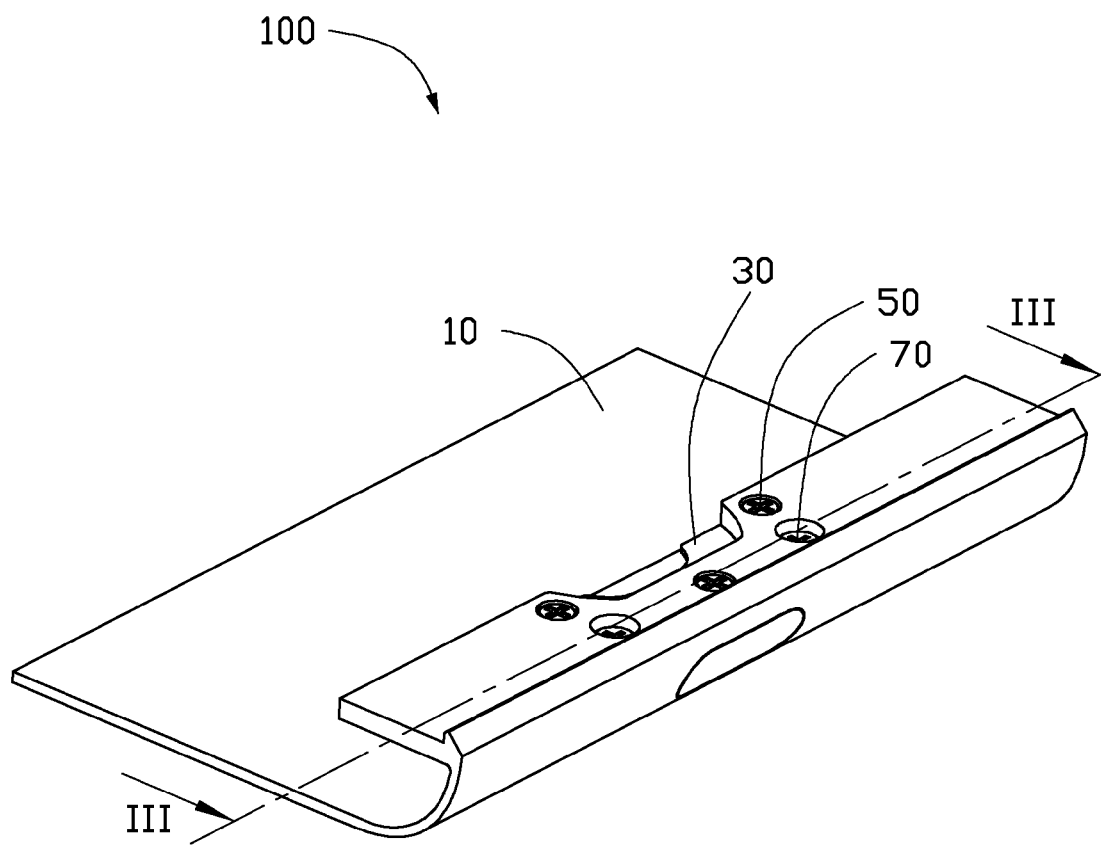
FIG. 1 is an isometric view of an embodiment of a housing of an electronic device.

FIG. 1 illustrates an embodiment of an electronic device housing 100 of the disclosure. The electronic device housing 100 can include a first housing 10, a second housing 30, three limiting members 50, and two fastening members 70. The first housing 10 and the second housing 30 can be adhered together and fastened by the fastening members 70. The limiting members 50 can limit a relative position of the first housing 10 and the second housing 30 during the fastening of the first housing 10 and the second housing 30, such that a gap defined between the first housing 10 and the second housing 30 can be even. In the illustrated embodiment, the first housing 10 can be an outer housing and made of aluminum. The second housing 30 can be a support member configured to support components of the electronic device. The second housing 30 can be made of copper. In alternative embodiments, the first housing 10 and the second housing 30 can be made of other materials. In an alternative embodiment, the second housing 30 can be made of plastic.

Figure 2:
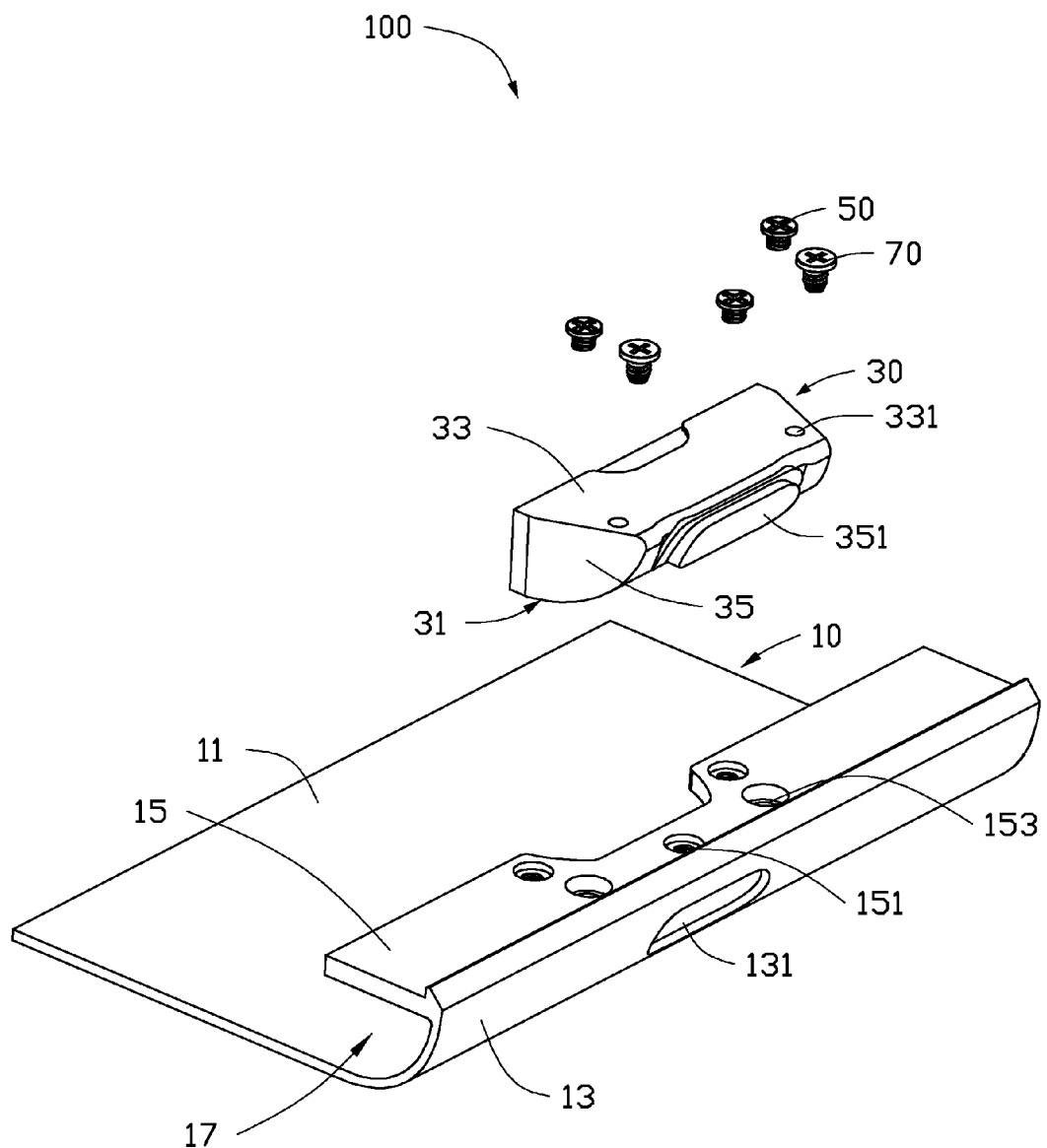
FIG. 2 is an exploded, isometric view of the housing of FIG. 1.

FIG. 2 illustrates that the first housing 10 can include a bottom wall 11, a sidewall 13, and a top wall 15. The sidewall 13 can be curved and connect the bottom wall 11 to the top wall 15. The bottom wall 11 and the top wall 15 can be substantially parallel to each other. The bottom wall 11, the sidewall 13, and the top wall 15 can cooperatively define a receiving chamber 17. The receiving chamber 17 can be configured to receive the second housing 30 and components of the electronic device. The sidewall 13 of the first housing 10 can define an opening 131. The opening 131 can communicate with the receiving chamber 17 and be configured to partially receive the second housing 30.

The top wall 15 of the first housing 10 can define three limiting holes 151 and two fastening holes 153. The limiting holes 151 and the fastening holes 153 can communicate with the receiving chamber 17. Both of the limiting holes 151 and the fastening holes can be stepped holes. The limiting holes 151 can be arranged at three points of an imaginary triangle, as opposed to a straight line. The fastening holes 153 and one of the three limiting holes 151 can be arranged in a straight line. The limiting holes 151 can be configured to couple to the limiting members 50. The fastening holes 153 can be configured to couple to the fastening members 70.

Figure 3:
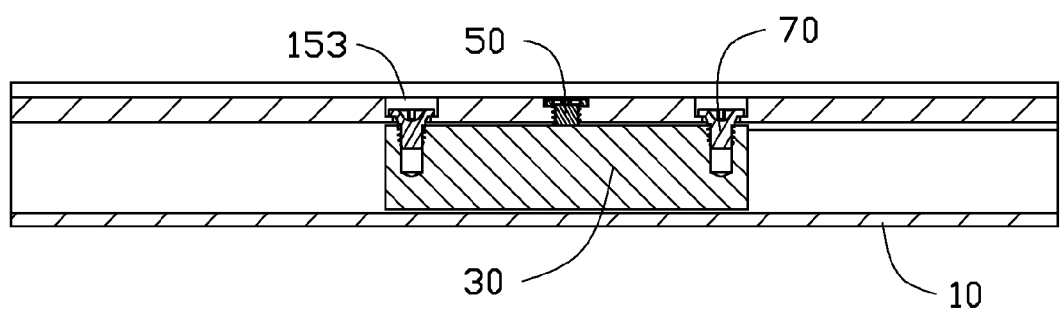
FIG. 3 is a sectional view of the housing of FIG. 1, taken alone line III-III.

FIGS. 2 and 3 illustrate the second housing 30 of the disclosure. The second housing 30 can be cuboid and be configured to support electrical elements of the electronic device. In the illustrated embodiment, the second housing 30 can be configured to support an I/O connector (not shown). The second housing 30 can be received in the receiving chamber 17 of the first housing 10. To ensure an accuracy of position of the I/O connector, the second housing 30 can be accurately assembled to the first housing 10.

The second housing 30 can include a bottom surface 31, a top surface 33, and four side surfaces 35. The bottom surface 31 can be substantially parallel to the top surface 33. The four side surfaces 35 can be coupled end to end in order. Each side surface 35 can be coupled to the top surface 33 and the bottom surface 31. The top surface 33 of the second housing 30 can define two fixing holes 331 corresponding to the two fastening holes 153. The fixing holes 331 can be configured to couple with the fastening members 70. A protruding portion 351 can protrude from one of the side surfaces 35 adjacent to the sidewall 13 of the first housing 10. The protruding portion 351 can be received in the opening 131 and partially be exposed from the opening 131. The bottom surface 31, the top surface 33, and the side surfaces 35 of the second housing 30 can be covered with thermal curing glue. Thus the bottom surface 31 can be adhered to the bottom wall 11. The top surface 33 can be adhered to the top wall 15. The side surfaces 35 can be adhered to the sidewall 13.

The three limiting members 50 can be inserted and threaded in the three limiting holes 151 of the top wall 15. The limiting members 50 can resist against the top surface 33 of the second housing 30. The limiting members 50 can be received in the corresponding limiting holes 151. Because the limiting holes 151 are not arranged in a straight line, a gap between the top surface 33 and the top wall 15 can be even when the limiting members 50 resist against the top surface 33. Thus, a gap between the bottom surface 31 and the bottom wall 11 can be even. In the illustrated embodiment, the limiting members 50 can be screws.

The fastening members 70 can be inserted in the fastening holes 153 of the top wall 15, respectively, and threaded into the fixing holes 331. Each fastening member 70 can be received in the corresponding fastening hole 153 and into the corresponding fixing hole 331. In the illustrated embodiment, the fastening members 70 can be screws.

Figure 4:
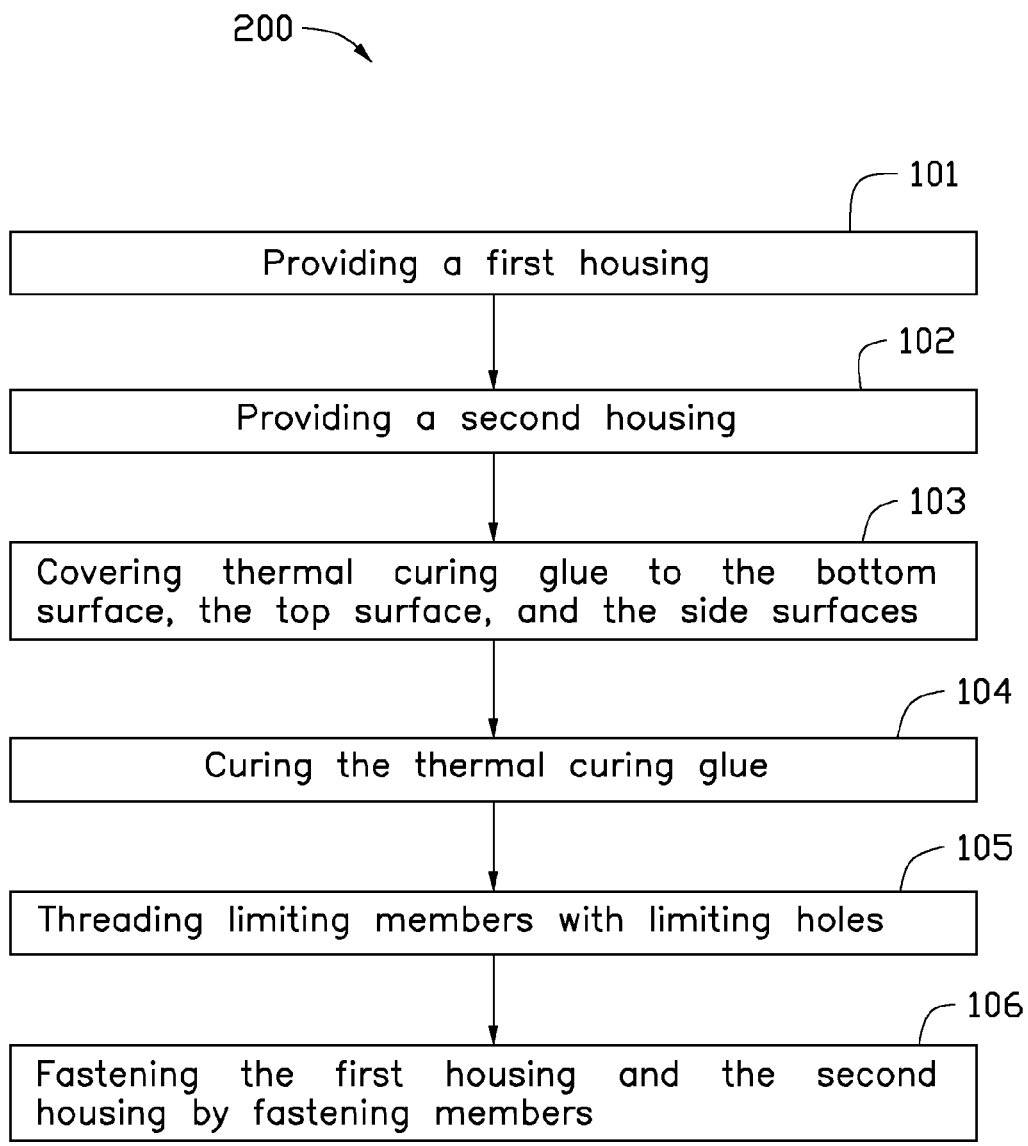
FIG. 4 is a flowchart showing a method for manufacturing the housing of FIG. 1.

FIG. 4 illustrates a method for manufacturing a housing of electronic device 200.

In block 101, a first housing can be provided. The first housing can include a bottom wall, a sidewall, and a top wall. The bottom wall, the sidewall, and the top wall can cooperatively define a receiving chamber. The sidewall of the first housing can define an opening. The top wall of the first housing can define three limiting holes and two fastening holes.

In block 102, a second housing can be provided. The second housing can include a bottom surface, a top surface, and four side surfaces. The top surface of the second housing can define two fixing holes corresponding to the two fastening holes. A protruding portion can protrude from one of the side surfaces corresponding to the opening.

In block 103, the bottom surface, the top surface, and the four side surfaces can be covered with thermal curing glue. The second housing 30 can be assembled to the receiving chamber. Thus the bottom surface can contact with the bottom wall. The top surface can contact with the top wall. The side surfaces can contact with the sidewall.

In block 104, the thermal curing glue can be heated and then cooled. The thermal curing glue can be cured. Thus, the bottom surface can be adhered to the bottom wall. The top surface can be adhered to the top wall. The side surfaces can be adhered to the sidewall.

In block 105, three limiting members can be provided. The limiting members can be inserted into the limiting holes and threaded with the limiting holes. The limiting members can resist against the top surface of the second housing.

In block 106, two fastening members can be provided. The fastening members can be inserted into the fastening holes and threaded into the fixing holes.

In an alternative embodiment, the fastening members can be assembled to the fastening holes and the fixing holes before the thermal curing glue is cured. For example, the block 104 can be processed after the block 106.

In an alternative embodiment, a number of the limiting members 50 can be one or more, and the limiting holes 151 can be one or more corresponding to the limiting members 50. A number of the fastening members 70 can be one or more, and the fixing holes 331 can be one or more corresponding to the number of the fastening members 70. The side surfaces 35 do not contact and adhere to the sidewall 13. Thus the thermal curing glue covers only the top surface 33 and the bottom surface 31.

It is believed that the present embodiments and their advantages will be understood from the foregoing description, and it will be apparent that various changes can be made thereto without departing from the spirit and scope of the embodiments or sacrificing all of its material advantages.

What is claimed is:

1. An electronic device housing comprising:
a first housing comprising a bottom wall, a top wall, and a sidewall coupling the bottom wall and the top wall, the bottom wall, the sidewall, and the top wall cooperatively defining a receiving chamber, the top wall of the first housing defining at least one limiting hole;
a second housing adhered to the first housing and received in the receiving chamber, the second housing comprising a top surface and a bottom surface, at least one of the top surface and the bottom surface being adhered to the corresponding top wall or bottom wall by thermal curing glue,
at least one limiting member being inserted in the at least one limiting hole and resisting against the top surface of the second housing, the at least one limiting member being configured to limit a relative position between the first housing and the second housing, thereby defining an even gap between the first housing and the second housing; and
at least one fastening member fixedly coupling the top wall of the first housing and the top surface of the second housing.

2. The electronic device housing of claim 1, wherein the top wall of the first housing further defines at least one fastening hole, the top surface of the second housing defines at least one fixing hole, and the at least one fastening member is inserted in the at least one fastening hole and threaded with the at least one fixing hole.

3. The electronic device housing of claim 2, wherein a number of the at least one fastening members is two, a number of the at least one fixing hole is two, a number of the at least one fastening hole is two, and the two fastening members are inserted in the two fastening holes and threaded with the two fixing holes.

4. The electronic device housing of claim 1, wherein the second housing further comprises a plurality of side surfaces coupled to the top surface and the bottom surface, and one of the plurality of side surfaces adjacent to the sidewall is adhered to the sidewall by thermal curing glue.

5. The electronic device housing of claim 4, wherein the sidewall of the first housing defines an opening communicating with the receiving chamber, a protruding portion protrudes from the side surface adhered to the sidewall, and the protruding portion is partially exposed from the opening.

6. The housing of electronic device of claim 1, wherein a number of the at least one limiting member is three, a number of the at least one limiting holes is three, the three limiting holes are arranged at three points of an imaginary triangle, and the three limiting members are inserted in the three limiting holes and resist against the top surface of the second housing.

7. A method for manufacturing an electronic device housing, the method comprising
providing at least one limiting member, at least one fastening member, and a first housing, the first housing comprising a bottom wall, a top wall, and a sidewall coupling the bottom wall and the top wall, the bottom wall, the sidewall, and the top wall cooperatively defining a receiving chamber, the top wall defining at least one limiting hole;
providing a second housing, the second housing comprising a top surface and the bottom surface;
covering at least one of the top surface and the bottom surface of the second housing with thermal curing glue, and assembling the second housing to the receiving chamber, the bottom surface contacting with the bottom wall, the top surface contacting with the top wall;
curing the thermal curing glue, the corresponding top surface and bottom surface, the thermal curing glue being adhered to the corresponding bottom wall or the top wall;
inserting the at least one limiting member in the at least one limiting hole and resisting against the top surface;
coupling the at least one fastening member with the top wall of the first housing and the top surface of the second housing.

8. The method of claim 7, wherein the top wall of the first housing further defines at least one fastening hole, the top surface of the second housing defines at least one fixing hole, and the at least one fastening member is inserted in the at least one fastening hole and threaded with the at least one fixing hole, thereby coupling the coupling the top wall of the first housing and the top surface of the second housing.

9. The method of claim 8, wherein a number of the at least one fastening members is two, a number of the at least one fixing hole is two, a number of the at least one fastening hole is two, and the two fastening members are inserted in the two fastening holes and threaded with the two fixing holes.

10. The method of claim 7, wherein the second housing further comprises a plurality of side surfaces coupled to the top surface and the bottom surface, and when the second housing is assembled to the receiving chamber, one of the plurality of side surfaces adjacent to the sidewall contacts with the sidewall.

11. The method of claim 7, wherein a number of the at least one limiting member is three, a number of the at least one limiting holes is three, the three limiting holes are arranged at three points of an imaginary triangle, and the three limiting members are inserted in the three limiting holes and resist against the top surface of the second housing.

12. A method for manufacturing an electronic device housing, the method comprising
providing at least one limiting member, at least one fastening member, and a first housing, the first housing comprising a bottom wall, a top wall, and a sidewall coupling the bottom wall and the top wall, the bottom wall, the sidewall, and the top wall defining a receiving chamber, cooperatively, the top wall defining at least one limiting hole;
providing a second housing, the second housing comprising a top surface and the bottom surface;
covering thermal curing glue to at least one of the top surface and the bottom surface of the second housing, and assembling the second housing to the receiving chamber, the bottom surface contacting with the bottom wall, the top surface contacting with the top wall;
inserting the at least one limiting member in the at least one limiting hole and resisting against the top surface;
coupling the at least one fastening member with the top wall of the first housing and the top surface of the second housing; and
curing the thermal curing glue, the corresponding one of the top surface and the bottom surface which covering the thermal curing glue being adhered to the corresponding bottom wall or the top wall.

13. The method of claim 12, wherein the top wall of the first housing further defines at least one fastening hole, the top surface of the second housing defines at least one fixing hole, and the at least one fastening member is inserted in the at least one fastening hole and threaded with the at least one fixing hole, thereby coupling the coupling the top wall of the first housing and the top surface of the second housing.

14. The method of claim 12, wherein the second housing further comprises a plurality of side surfaces coupled to the top surface and the bottom surface, and when the second housing is assembled to the receiving chamber, one of the plurality of side surfaces adjacent to the sidewall contacts with the sidewall.

15. The method of claim 12, wherein a number of the at least one limiting member is three, a number of the at least one limiting holes is three, the three limiting holes are arranged at three points of an imaginary triangle, and the three limiting members are inserted in the three limiting holes and resist against the top surface of the second housing.

* * * * *